US009167117B2

(12) United States Patent
Nishizaki

(10) Patent No.: US 9,167,117 B2
(45) Date of Patent: Oct. 20, 2015

(54) MAIN BODY DEVICE, SLAVE DEVICE, AND PROGRAM UPDATE METHOD

(71) Applicant: SEIKO EPSON CORPORATION, Tokyo (JP)

(72) Inventor: Yutaka Nishizaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/331,687

(22) Filed: Jul. 15, 2014

(65) Prior Publication Data
US 2015/0029546 A1    Jan. 29, 2015

(30) Foreign Application Priority Data
Jul. 29, 2013    (JP) .................................. 2013-157072

(51) Int. Cl.
*H04N 1/04* (2006.01)
*H04N 1/00* (2006.01)
*G06F 9/445* (2006.01)

(52) U.S. Cl.
CPC .............. *H04N 1/00962* (2013.01); *G06F 8/65* (2013.01)

(58) Field of Classification Search
USPC .......................................... 358/1.15, 1.9, 474
See application file for complete search history.

(56) References Cited

U.S. PATENT DOCUMENTS

2004/0068548 A1    4/2004 Sugita

FOREIGN PATENT DOCUMENTS

JP    1987-018001    *    1/1987    ................ H04L 1/08
JP    2004-029876 A        1/2004

* cited by examiner

*Primary Examiner* — Houshang Safaipour
(74) *Attorney, Agent, or Firm* — Global IP Counselors, LLP

(57) ABSTRACT

An update program is acquired in a main body device from an external device, a generation of noise from a noise generating source that has possibility to generate noise to a communication between the main body device and the slave device is suppressed, and after that, a slave device update program is transferred from the main body device to the slave device in the second communication method (second communication speed) which is faster than the first communication method (first communication speed).

8 Claims, 7 Drawing Sheets

MAIN BODY DEVICE, SLAVE DEVICE, AND PROGRAM UPDATE METHOD

CROSS-REFERENCE TO RELATED APPLICATIONS

This application claims priority to Japanese Patent Application No. 2013-157072 filed on Jul. 29, 2013. The entire disclosure of Japanese Patent Application No. 2013-157072 is hereby incorporated herein by reference.

BACKGROUND

1. Technical Field

The present invention relates to a main body device, a slave device, and a program update method.

2. Related Art

As an image forming apparatus, it is well known that a printer controls the entire device by sending plural kinds of commands to an engine controller which is secondary from a main controller connected to an external device (see Japanese Laid-open Patent Application Publication No. 2004-29876). In a rewrite mode for rewriting a firmware, this printer improves a communication efficiency between the main controller and the engine controller by limiting the commands used for a communication between the main controller and the engine controller in comparison with a print mode so that a rewrite efficiency of the firmware is improved.

At the present that a processing speed of a program itself has been improved, the ratio that occupies the processing time of the program itself to improve efficiency in Japanese Laid-open Patent Application Publication No. 2004-29876 is small in comparison with a rewrite data transfer processing that occupies most of a firmware rewriting processing so that the shortened time is little.

The aforementioned problem is not limited to the printer, and it is existed in a variety of technologies in a manner that the main body device and the slave device are communicated.

SUMMARY

In view of the description above, one of advantages of the present invention is to shorten an update processing time of a program for a slave control unit that controls a slave device.

To achieve one of the aforementioned advantages, a main body device according to an aspect of the invention, which is configured to communicate with a slave device, is provided with an acquisition unit configured to acquire an update program including at least a slave device update program which controls the slave device, and a main body control unit configured to control the main body device, and when the acquisition unit acquires the update program, the main body control unit suppresses a generation of noise from a noise generating source which has a possibility to generate noise to a communication between the main body device and the slave device, and subsequently, transmit the slave device update program to the slave control unit in the second communication method which is faster than the first communication method, and the first communication method is a communication method performed between the main body device and the slave device before the generation of noise is suppressed.

In the aforementioned aspect, when the update program was acquired, by suppressing the generation of noise from the noise generating source, the slave device update program can be transmitted to the slave control unit in the second communication method which is faster than the first communication method performed between the main body device and the slave device before the generation of noise is suppressed. Accordingly, the aforementioned aspect can provide the main body device that is possible to shorten the update processing time of a program for a slave control unit that controls the slave device.

Here, the main body device and the slave device may be configured in the separate housings so that it is separable, or it may be configured in the same housing so that it is not separable. Accordingly, the main body control unit and the slave control unit may be provided in the separate housings, or it may be provided in the same housing.

The update program may include a main body device update program, etc. for the main body control unit, or it may not include the main body device update program, etc.

The noise generating source may be provided in the main body device, or it may be provided in the slave device, or it may be provided in other than the main body device and the slave device.

After transmitting the slave device update program included in the update program, which includes the main body device update program for own device to the slave control unit, the main body control unit may control the slave control unit to execute updating a program by using the slave device update program, and subsequently may execute own program update by using the main body device update program. In this aspect, the program update of the main body control unit is performed after the program update of the slave control unit was performed so that an appropriate process example of the program update can be provided.

After suppressing the generation of noise from the noise generating source, the main body control unit may notify that the second communication method is used for the slave control unit. In this aspect, the slave control unit can grasp that the second communication method is used so that an appropriate process example of the program update can be provided.

A plurality of slave devices capable of communicating with the main body device may be provided. The noise generating source may be provided in the second slave device which is capable of communicating with the main body device. The main body control unit controls the second slave device to suppress the generation of noise from the noise generating source, and after that, the slave device update program may be transmitted to the slave control unit of the slave device in the second communication method. When the main body control unit transmits the slave device update program to the slave control unit of the first slave device, by suppressing the generation of noise from the noise generating source provided in the second slave device which is different from the main body device and the first slave device, the slave device update program can be transmitted in the second communication method which is high speed. Accordingly, in the present aspect, an appropriate process example of the program update can be provided.

Also, the noise generation source may be provided in the main body device. After the slave device update program included in the update program, which includes the main body body device update program for own device, has been transmitted to the slave control unit, the main body control unit executes own program update by using the main body device update program and the restart may be performed. In the noise generating source, the suppression of the generation of noise may be terminated in accordance with the restart of the main body control unit. In this aspect, the suppression of the generation of noise from the noise generating source provided in the main body device is terminated after the slave device update program was transmitted to the slave control unit so that an appropriate process example of the program update can be provided.

Further, the noise generating source may be provided in the slave device. After the slave device update program has been transmitted to the slave control unit, the main body control unit controls the salve control unit to execute the program update by using the slave device update program and the slave control unit may be restarted. In the noise generating source, the suppression of the generation of noise may be terminated in accordance with the restart of the slave control unit. In this aspect, the suppression of the generation of noise from the noise generating source provided in the slave device is terminated after the slave device update program was transmitted to the slave control unit so that an appropriate process example of the program update can be provided.

A slave device according to another aspect of the invention, which is configured to communicate with a main body device which acquires an update program from an external device is provided with a slave control unit configured to control the slave device and executes a program update by using a slave device update program for own device, and when the main body control unit that controls the main body device starts a transmission of the slave device update program which is included in the update program, the slave control unit suppresses a generation of noise from a noise generating source that has a possibility to generate noise to a communication between the main body device and the slave device, and subsequently receives the slave device update program from the main body control unit in the second communication method which is faster than the first communication method. The first communication method is a communication method performed between the main body device and the slave device before the generation of noise is suppressed.

In the aforementioned aspect, when the transmission of the slave device update program is started, by suppressing the generation of noise from the noise generating source, the slave device update program can be received from the main body control unit in the second communication method which is faster than the first communication method. Accordingly, the aforementioned aspect can provide the slave device that is possible to shorten the update processing time of a program for a slave control unit that controls the slave device.

Further, the program update method according to another aspect of the invention includes: acquiring an update program, which includes at least a slave device update program for a slave control unit that is configured to control a slave device, from an external device in a main body device; suppressing a generation of noise from a noise generating source that has a possibility to generate noise to a communication between the main body device and the slave device in a case where the update program has been acquired; and transferring the slave device update program from the main body device to the slave device in the second communication method which is faster than the first communication method after the generation of noise from the noise generating source has been suppressed. The first communication method is a communication method performed between the main body device and the slave device before the generation of noise is suppressed.

In the aforementioned aspect, when the update program was acquired, by suppressing the generation of noise from the noise generating source, the slave device update program can be transferred to the slave device from the main body device in the second communication method which is faster than the first communication method. Accordingly, the aforementioned aspect can provide the program update method that is possible to shorten the update processing time of a program for a slave control unit that controls the slave device.

The aforementioned invention is applicable to a parallel type processor provided with the main body device and the slave device, a system provided with the parallel type processor, a main body program that realizes a function corresponding to a main body device means in a computer, a slave program that realizes a function corresponding to a slave device means in a computer, a program that realizes a function corresponding to a parallel type processor means in a computer, a program that realizes a function corresponding to a means of the system, a computer readable medium in which these programs are recorded, and a method corresponding to these programs, etc.

BRIEF DESCRIPTION OF THE DRAWINGS

Referring now to the attached drawings which form a part of this original disclosure.

DETAILED DESCRIPTION OF EXEMPLARY EMBODIMENTS

Hereinafter, the embodiments of the present invention will be described. The following embodiments are only an example of the present invention, and therefore, it is not limited to all the features shown in the embodiments that are required for the solving means of the present invention.

Figure 1:
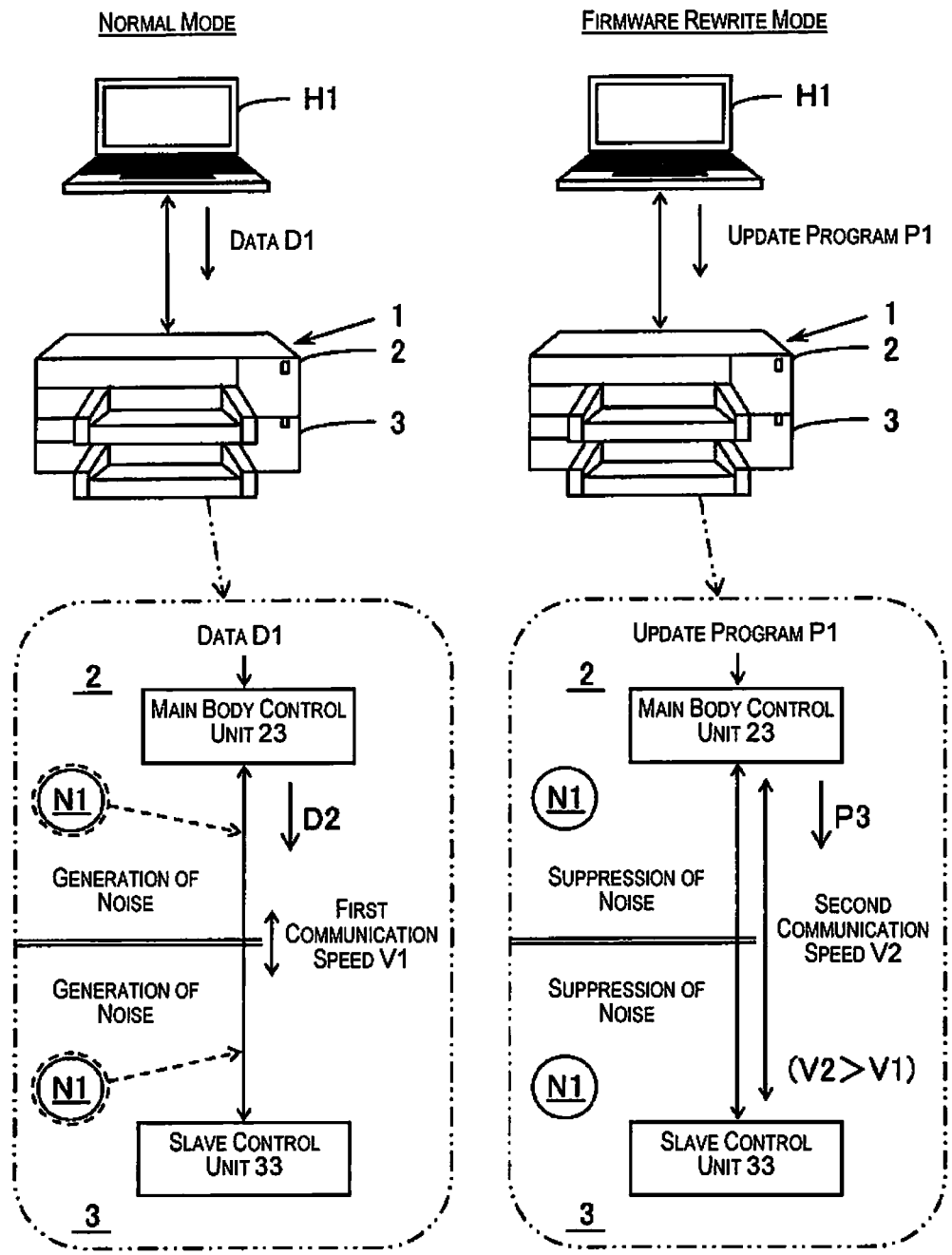
FIG. 1 is a schematic diagram exemplifying an operation of a recording device (parallel type processor 1) provided with a main body device 2 and a slave device 3.
Figure 2:
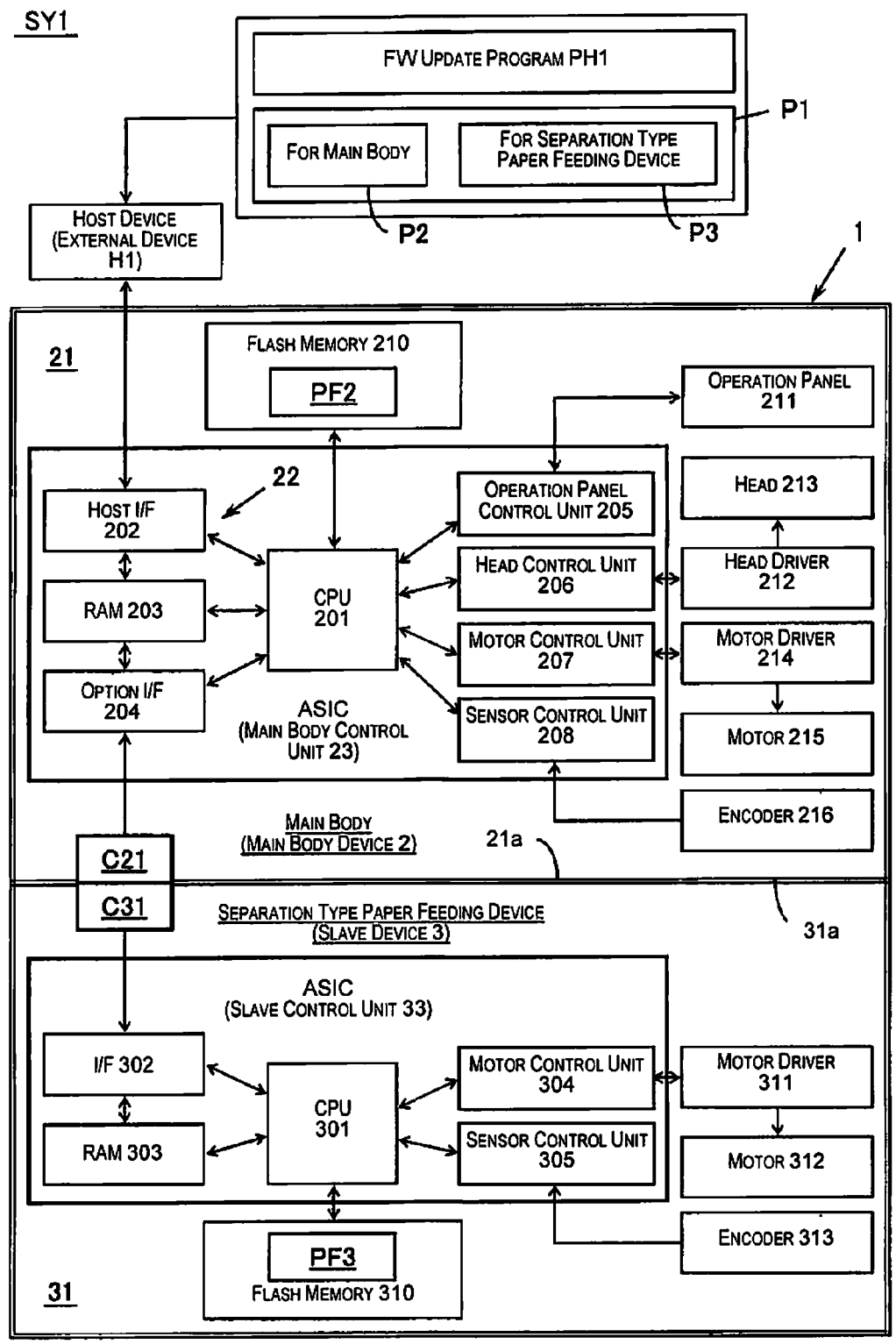
FIG. 2 is a schematic diagram exemplifying a configuration of a system SY1.

Outline of Parallel Type Processor Provided with Main Body Device and Slave Device FIG. 1 is a schematic diagram exemplifying a printer (recording device) overlapped with a separation type paper feeding device (slave device 3) such as an additional paper feeding cassette under a printer main body (main body device 2) as a parallel type processor 1 which is provided with a main body device 2 and a slave device 3. The printer (recording device) includes an inkjet printer, a wire dot printer, a laser printer, a line printer, a copying machine, a facsimile, and a multifunction device which combines at least a part of them, etc. FIG. 2 is a schematic diagram exemplifying a configuration of a recording system SY1 which includes the printer. In a main body (2), a main body device firmware PF2 that realizes a function as a main control unit in a computer is stored. In a paper feeding device (3), a slave device firmware PF3 that realizes a function as a control unit which is subordinate to the main control unit is stored. Further, the main body (2) is capable of directly communicating with a host device (external device H1), and on the other hand, the paper feeding device (3) does not have a direct communication means with the host device.

When it is in a normal mode that performs printing (recording) on a printing paper (recording medium), the printer receives data D1 for printing from, for example, a host device, and based on the data D1, the feeding is performed by driving a motor of the paper feeding device (3), and the printing paper is carried by driving the motor of the main body (2) and a head is reciprocated so as to perform printing by driving the head of the main body (2). The data D1 for printing is received in the main body (2), but driving the motor of the paper feeding device (3) is the paper feeding device (3). Therefore, it is necessary to transmit data D2 for driving the motor of the paper feeding device (3) from a main body control unit 23 to a slave control unit 33 of the paper feeding device.

Here, when the operation of the motor or the head is performed, there is a possibility to cause a generation of noise. The motor, etc. has a possibility to case the generation of noise as a noise generating source N1 to a communication between the main body (2) and the paper feeding device (3). Specifically, the motor is easy to cause the generation of strong noise because a high-voltage current flows. For example, the brush motor has a seam in a brush so as to easily generate the noise. When the experiment was conducted, there was the noise that was generated in an interval of approximately few μsec (micro seconds).

For example, when the speed of the data transfer from the main body to the paper feeding device is 120000 bps, the transfer time per 1 bit is 1000000/120000=8.3 μsec, and therefore, when the data is changed by the noise generated in an interval of approximately few μsec, there is a possibility to transfer erroneous data. On the other hand, when the speed of the data transfer from the main body to the paper feeding device is 20000 bps, the transfer time per 1 bit is 50 μsec, and therefore, the data can be accurately transferred by a countermeasure such as a multistage filtering, etc. Normally, a communication speed between the main body (2) and the paper feeding device (3) is limited to the first communication speed V1 (V1>0), for example, approximately 10000 to 30000 bps which is relatively slow. Accordingly, by performing a communication in the first communication speed V1 that is a communication speed to perform a communication in a manner of suppressing the effect of the problematic noise (e.g., noise generated in an interval of approximately few μsec), even when the noise is generated, the data can be surely transmitted to the slave control unit 33 from the main body control unit 23. The communication method performed in the first communication speed V1 is the first communication method that performs between the main body device 2 and the slave device 3 before the generation of noise from the noise generating source N1 is suppressed.

After the printer was released, for example, when a new printing paper compatible with an ultra-high image is released, it is necessary that the printer becomes compatible with the new printing paper so that the firmware has to be updated. The update of the firmware is performed in a firmware rewrite mode.

The main body device 2 of the present technology is provided with an acquisition unit 22 (see FIG. 2) that acquires an update program P1, which includes at least a slave device update program P3 for the slave control unit 33 controlling the slave device 3, from an external device H1, and a main body control unit 23 that controls the main body device 2. When the acquisition unit 22 acquired the update program P1, the main body control unit 23 suppresses the generation of noise from the noise generating source N1, and after that, the slave device update program P3 is transmitted to the slave control unit 33 in the second communication method (the second communication speed V2) which is faster than the aforementioned first communication method (first communication speed V1).

Further, the slave device 3 of the present technology is provided with the slave control unit 33 that controls the slave device 3 and executes a program update by using the slave device update program P3 for own device. When the main body control unit 23 starts the transmission of the slave device update program P3 included in the update program P1, the slave control unit 33 suppresses the generation of noise from the noise generating source N1, and after that, the slave device update program P3 is received from the main body control unit 23 in the second communication method (the second communication speed V2, which is faster than the first communication method (the first communication speed V1).

When the firmware is transferred and rewritten, it is not required to operate the noise generating source N1 such as a motor, etc. Therefore, entering the noise from the noise generating source N1 such as a noise generated in an interval of the aforementioned few μsec to the communication between the main body (2) and the paper feeding device (3) is suppressed by suspending or reducing the operation of the noise generating source N1 (including suspension). Therefore, it is possible to perform a communication between the main body (2) and the paper feeding device (3) in the method that is smaller noise than the first communication method. When the main body control unit 23 and the slave control unit 33 transfers the slave device update program P3, the communication speed between the main body (2) and the paper feeding device (3) increases to the second communication speed V2 (V2>V1) of approximately 50000 to 200000 bps that is relatively fast. The communication method in the second communication speed V2 is the second communication method performed between the main body device 2 and the slave device 3 when the slave device update program P3 is transferred.

From the above, the time for the rewrite data transfer processing that occupies most of the firmware rewriting processing is shortened. Accordingly, in the present technology, it is possible to shorten the update processing time of the program such as the firmware PF3 for the slave control unit 33 that controls the slave device 3.

Configuration of Parallel Type Processor Provided with Main Body Device and Slave Device The recording system SY1 shown in FIG. 2 is provided with the printer (parallel type processor 1) and the host device (external device H1). As the host device, it includes a computer such as a personal computer, a digital camera, a mobile phone such as a smartphone, etc. The host device transmits the recording data for forming an image to the printer main body (main body device 2) by installing a software of a printer driver, etc. if necessary. Further, the host device acquires the firmware update program PH1 that includes the update program P1 for the firmware of the printer, and the update program P1 is transmitted to the printer main body (main body device 2) in accordance with the program PH1. For the installation of the firmware update program PH1, downloading from a server through a communication network such as Internet, reading out from a computer readable recording medium such as a disk-shaped recording medium, etc. are included. In the update program P1 shown in FIG. 2, the main body device update program P2 and the slave device update program P3 are included, but the main body device update program P2 may not be included in the update program P1. The main body device update program P2 may be a program to update the whole firmware PF2, or may be a program to update a part of the firmware PF2. Also, the slave device update program P3 may be a program to update the whole firmware PF3, or may be a program to update a part of the firmware PF3.

The printer main body (main body device 2) is provided with the ASIC (Application Specific Integrated Circuit), and respective parts 210 to 216 directly or indirectly connected to the ASIC, etc. in the housing 21. In the ASIC, a host I/F (interface) 202, a Random Access Memory (RAM) 203, an option I/F 204, an operation panel control unit 205, a head control unit 206, a motor control unit 207, and a sensor control unit 208, etc. are connected to a Central Processing Unit (CPU) 201. The main body device firmware PF2 is stored in a flash memory 210. The CPU 201 controls the whole main body in accordance with the main body device firmware PF2. The host I/F 202 performs a data communication with the host device such as receiving printing data from the host device, receiving the update program P1 and storing it in the RAM 203, etc. The RAM 203 may be provided outside the ASIC, or may be provided in both inside the ASIC and outside the ASIC. The option I/F 204 performs a data communication with the paper feeding device I/F 302 such as transmitting paper feeding data through connectors C21, C31, transmitting the slave device update program P3, etc. The option panel control unit 205 controls an operation of the operation panel 211. The head control unit 206 controls an operation of the head driver 212. This head driver 212 generates a high-voltage head drive signal in accordance with a head control signal from the head control unit 206 and it is supplied to the head 213. The head 213 performs printing on a printing paper by ejecting the ink in accordance with the head drive signal. The motor control unit 207 controls an operation of the motor driver 214. This motor driver 214 generates a high-voltage motor drive signal in accordance with a motor control signal from the motor control unit 207 and it is supplied to a motor 215 provided with an encoder 216. The motor 215 operates an object to be driven such as conveying a printing paper in accordance with the motor drive signal, etc. The sensor control unit 208 manages a position of an object to be driven based on a pulse signal from the encoder 216. An interface that inputs a detection signal from a sensor which detects an object to be detected such as existence or non-existence of the slave device 3 or existence or non-existence of a printing paper, etc. may be provided in the ASIC.

The separation type paper feeding device (slave device 3) is provided with the ASIC, and respective parts 310 to 313 directly or indirectly connected to the ASIC, in the housing 31. In the ASIC, a CPU 301, an I/F 302, a RAM 303, a motor control unit 304, a sensor control unit 305, etc. are connected. The slave device firmware PF3 is stored in the flash memory 310. The CPU 301 controls whole the paper feeding device in accordance with the slave device firmware PF3. The I/F 302 performs a data communication with the option I/F 204 of the main body such as receiving paper feeding data through the connectors C21, C31, receiving the slave device update program P3 and storing it in the RAM 303, etc. The RAM 303 may be provided outside the ASIC, or may be provided both inside the ASIC and outside the ASIC. The motor control unit 304 controls an operation of the motor driver 311. This motor driver 311 generates a high-voltage motor driver signal in accordance with a motor control signal from the motor control unit 304, and it is supplied to a motor 312 provided with an encoder 313. The motor 312 operates an object to be driven such as feeding paper in accordance with the motor drive signal, etc. The sensor control unit 305 manages a position of the object to be driven such as a printing paper, etc. based on a pulse signal from the encoder 313. An interface that inputs a detection signal from a sensor which detects an object to be detected such as existence or non-existence of a printing paper, etc. may be provided in the ASIC.

Here, the host I/F 202 and the RAM 203 configures the acquisition unit 22, and the ASIC of the main body configures the main body control unit 23, and the ASIC of the paper feeding device configures the slave control unit 33. Further, the motors 215, 312, and the head 213 configures the noise generating source N1. The noise generating source N1 is not provided in the slave device 3 but it may be provided in the main body device 2, or it is not provided in the main body device 2 but it may be provided in the slave device 3, or it may be provided in a place other than the main body device 2 and the slave device 3.

The connector C21 of the main body is arranged on the bottom surface 21a of the main body. On the other hand, the connector C31 of the paper feeding device is arranged on the upper surface 31a of the paper feeding device. Accordingly, the positions of the connectors C21, C31 are aligned and the main body is mounted on the paper feeding device so that the paper feeding device is operated in matching with the operation of the main body.

Figure 3:
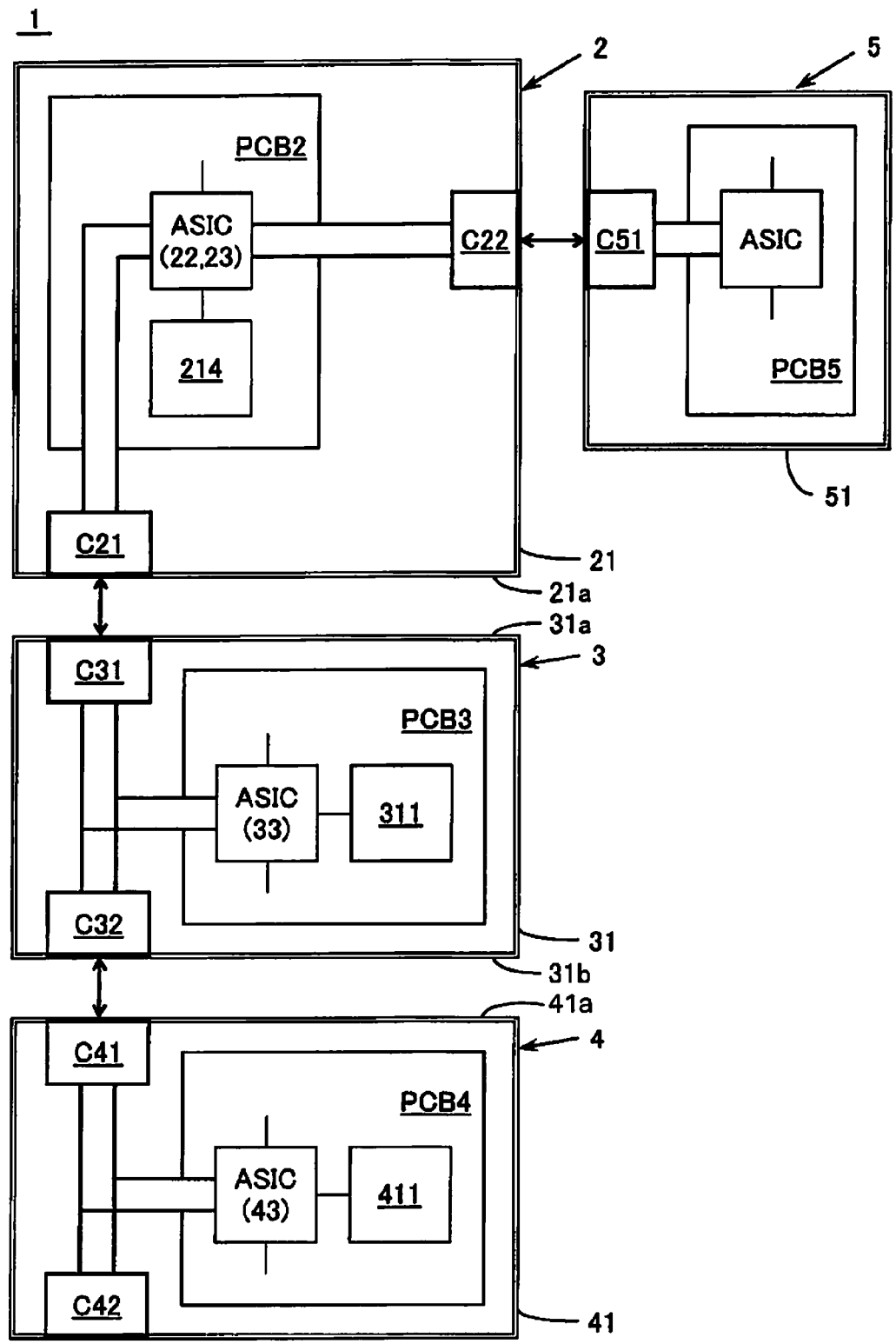
FIG. 3 is a schematic exploded diagram exemplifying a configuration of a recording device (parallel type processor 1) that includes the second slave device.

Further, as the parallel type processor 1 shown in FIG. 3, a connector C41 arranged on the upper surface 41a of the paper feeding device which is separate from the connector C32 arranged in the bottom surface 31b of the paper feeding device is aligned and mounted so that it is possible to stack a plurality of stages of the separation type paper feeding devices (slave device 3, 4).

In the housing 21 of the main body device 2 shown in FIG. 3, the ASIC (acquisition unit 22 and main body control unit 23), and the print substrate PCB2 in which the peripheral circuit such as a motor driver 214, etc. is mounted are fixed. The connector C21 provided on the bottom surface 21a of the housing 21 and the ASIC are connected by a communication cable such as the flexible flat cable (FFC).

In the housing 31 of the slave device 3 shown in FIG. 3, the ASIC (slave control unit 33) and the print substrate PCB3 in which a peripheral circuit such as the motor driver 311, etc. is mounted are fixed. The connector C31 provided on the upper surface 31a of the housing 31, the connector C32 provided on the bottom surface 31b of the housing 31, and the ASIC are connected by a communication cable such as the FFC. The connector C31 of the upper surface 31a and the connector C21 of the main body device 2 are connected.

The second slave device 4 shown in FIG. 3 is configured in the same manner as the first slave device 3. In the housing 41 of the second slave device 4, the ASIC (second slave control unit 43), and a print substrate PCB4 in which the peripheral circuit such as a motor driver 411, etc. is mounted are fixed. The connector C41 provided on the upper surface of the housing 41, the connector C42 provided on the bottom surface of the housing 41, and the ASIC are connected by a communication cable such as the FFC. The connector C41 of the upper surface and the connector C32 of the slave device 3 are connected. It is possible to stack the second slave device 4 under the paper feeding device, etc.

Further, as the connector C22 shown in FIG. 3, when the connector C22, which is different from the connector C21 of the bottom surface 21a, is provided in the main body device 2, the second slave device 5 of a finisher, etc. such as a bookbinding apparatus can be provided in a position that is different from the bottom surface 21a of the main body device 2. The second device means a slave device which is different from the first slave device, and an existence of a plurality of second slave devices 4, 5 is accepted. In the second device 5 shown in FIG. 3, the ASIC and the print substrate PCB5 on which the peripheral circuit is mounted are fixed in the housing 51. The connector C51 provided in the housing 51 and the ASIC are connected by a communication cable such as the FFC. The connector C51 and the connector C22 of the main body device 2 are connected.

Figure 4:
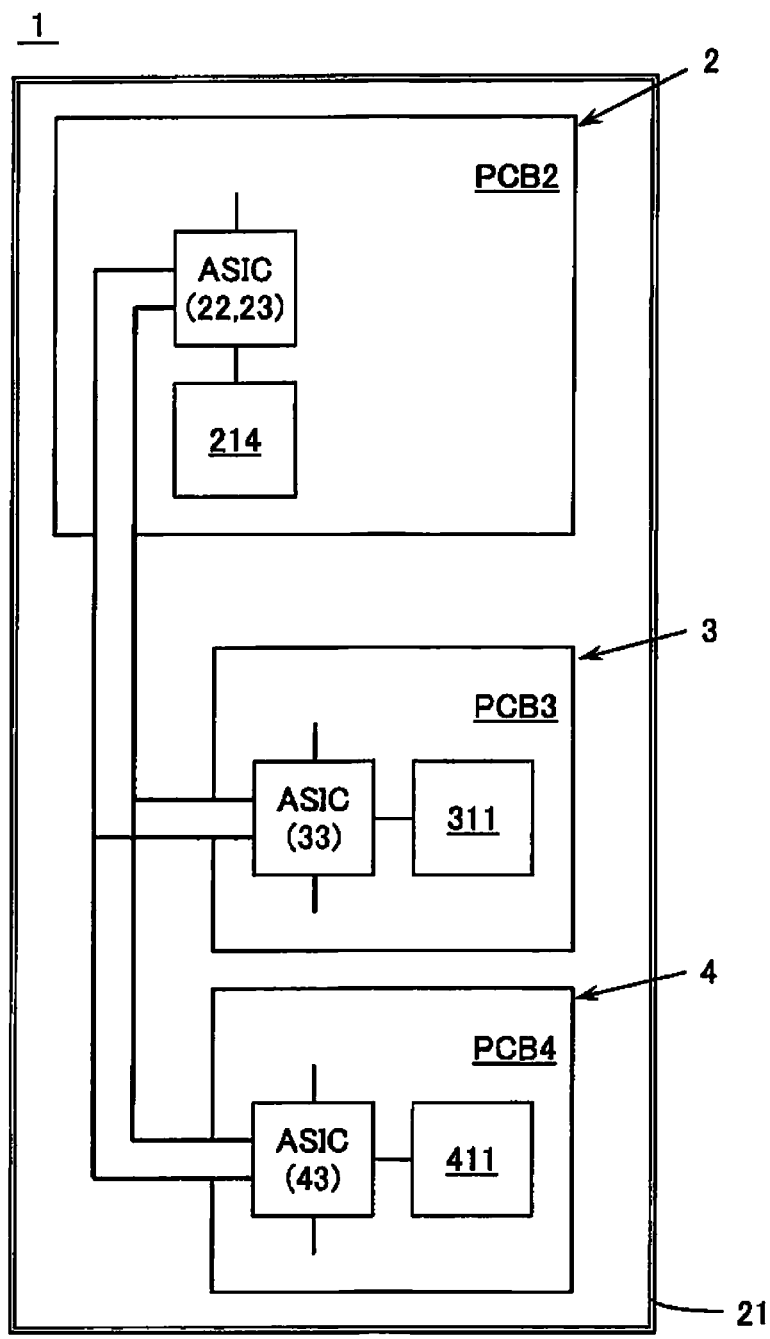
FIG. 4 is a schematic diagram showing a modified example of a recording device (parallel type processor 1)

As the parallel type processor 1 shown in FIG. 4, the main body control unit 23 and the slave control unit 33 may be positioned in the same housing 21. In this case, the print substrate PCB2, which configures the acquisition unit 22 and the main body control unit 23, configures the main body device 2, and the print substrate PCB3, which configures the slave control unit 33, configures the slave device 3. Also, when the second slave control unit 43 is positioned in the housing 21, the print substrate PCB4, which configures the second slave control unit 43, configures the second slave device 4. The present device 1 can shorten the update processing time of the program for the slave control unit which is positioned in a common same housing of the main body control unit.

Specific Example of Program Update Method

Figure 5:
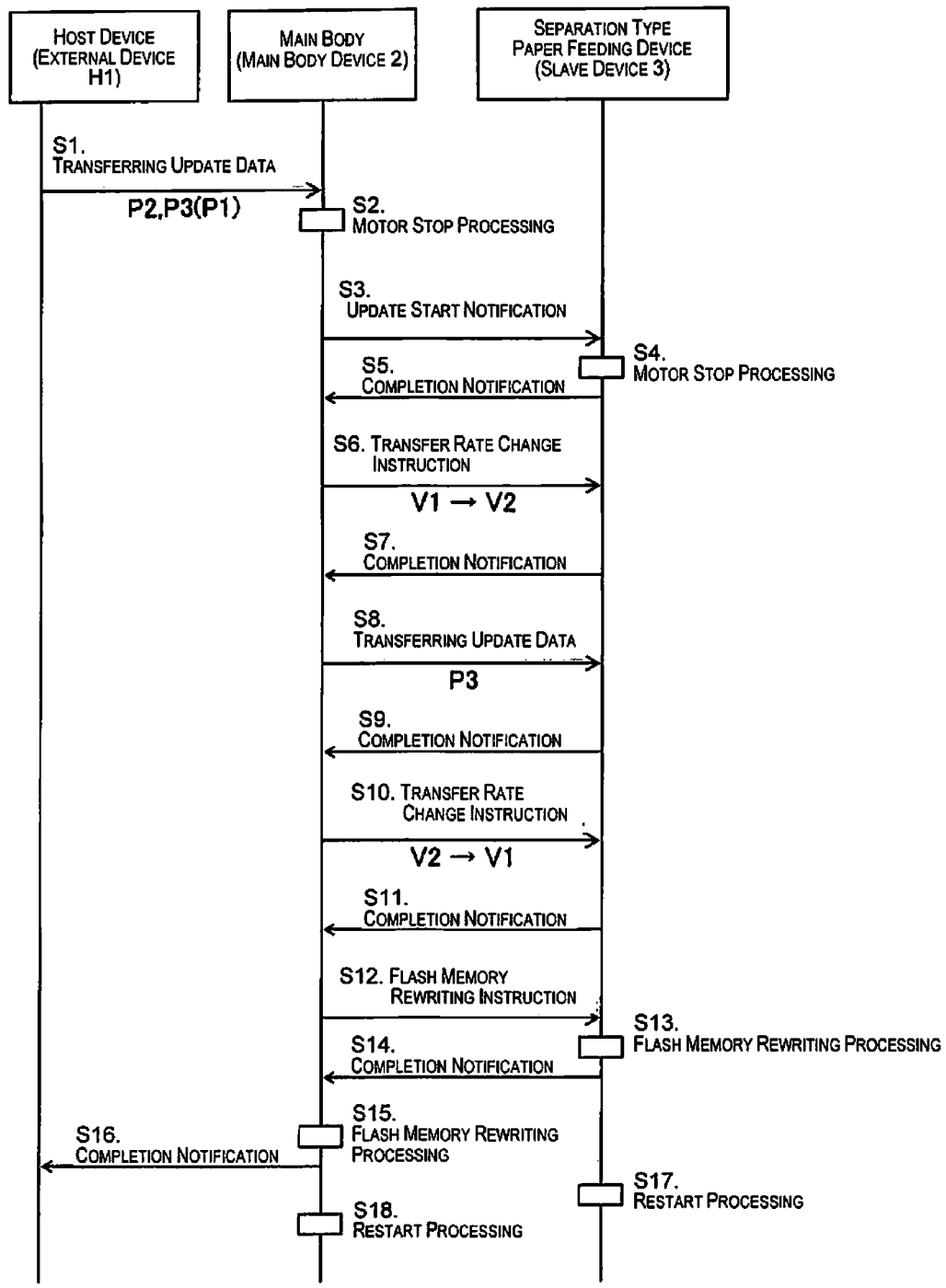
FIG. 5 is a sequence diagram exemplifying an operation of the system SY1.

FIG. 5 exemplifies operations of the recording system SY1 that includes the main body device 2 and the slave device 3. The operations shown as a sequence diagram have a specification such that the update program P1 includes the main body device update program P2 and the slave device update program P3, and the noise generating source N1 indicates as the motors 215, 312, and the update processing starts by using an update data transfer from the host device as a trigger.

When the external device H1 transmits the update program P1 to the main body device 2, the main body device 2 acquires the update program P1 from the host I/F 202 and stores it in the RAM 203 (Step S1). Step S1 is a step for acquiring the update program, and corresponds to the acquisition unit 22. Next, a sleep signal that retains the motor driver 214 in a sleep state is outputted from the motor control unit 207 to the motor driver 214, and it maintains the motor 215 in a stop state (Step S2). At this time, the sleep signal is outputted from the head control unit 206 to the head driver 212 so that the head driver 212 becomes in the sleep state, and the head 213 may maintain in the stop state. By processing Step S2, the generation of noise from the noise generating source N1 provided in the main body device 2 is suppressed. If the noise generating source is not provided in the main body device, the processing of Step S2 may be omitted.

After that, the main body control unit 23 notifies a firmware update start to the slave control unit 33 (Step S3). At this time, in the communication between the main body device 2 and the slave device 3, there is a possibility of the generation of noise from the noise generating source N1 provided in the slave device 3 so that it is performed in the first communication method (the first communication speed V1).

The slave control unit 33 that received the update start notification outputs a sleep signal, which retains the motor driver 311 in the sleep state, from the motor control unit 304 to the motor driver 311, and the motor 312 maintains in the stop state (Step S4). By this processing, the generation of noise from the noise generating source N1 provided in the slave device 3 is suppressed. If the noise generating source is not provided in the slave device, the processing of Step S4 may be omitted. When the stop processing of the motor 312 is completed, the slave control unit 33 notifies a completion of processing to the main body control unit 23 (Step S5).

The aforementioned Steps S2 and S4 correspond to a suppressing step that suppresses the generation of noise from the noise generating source N1.

At the time of the firmware update, for example, as described in Japanese Laid-open Patent Application Publication No. 2004-29876, the commands to be used can be limited. Therefore, the usable commands in any of the aforementioned Steps S3 to S5 may be reduced to a part of the commands that suppresses the generation of noise from the noise generating source N1.

After that, the main body control unit 23 notifies to the slave control unit 33 that the transfer rate is changed from the first communication speed V1 to the second communication speed V2 (Step S6). This notification is to notify that the second communication method is used, and it is performed in the first communication speed V1. After the notification was performed, the main body control unit 23 switches to a setting that uses the second communication method (second communication speed V2) for a communication between the main body device 2 and the slave device 3. The slave control unit 33 that received this notification switches to the setting that uses the second communication method (second communication speed V2) for the communication between the main body device 2 and the slave device 3, and notifies a completion of processing to the main body control unit 23 (Step S7). This notification of the completion of processing is performed in the second communication method (second communication speed V2). Accordingly, the slave control unit can grasp that the second communication method is used in the processing of Step S6 so that the present processing is an appropriate example of the program update. If the noise generating source is not provided in the slave device, the process may proceed to Step S6 immediately after the firmware update start was notified in Step S3. Further, in this case, the notification of the firmware update start may be combined with the notification that the transfer rate is changed from the first communication speed V1 to the second communication speed V2.

After that, the main body control unit 23 transmits the slave device update program P3 included in the update program P1 to the slave control unit 33 in the second communication method (second communication speed V2) (Step S8). The slave control unit 33 acquires the slave device update program P3 from the main body control unit 23, and stores it in the RAM 303. Step S8 corresponds to the transfer operation that transfers the slave device update program P3. When the slave control unit 33 completes the reception of the slave device update program P3, it notifies the completion of processing to the main body control unit 23 (Step S9).

When the transferring of the slave device update program P3 is completed, it is not required to suppress the generation of noise from the noise generating source N1. The main body control unit 23 of the present example notifies to the slave control unit 33 that the transfer rate is changed from the second communication speed V2 to the first communication speed V1 (Step S10). This notification is to notify that the first communication method is used. The slave control unit 33 that received the notification switches to the setting that uses the first communication method (first communication speed V1) for the communication between the main body device 2 and the slave device 3, and notifies the completion of processing to the main body control unit 23 (Step S11). Therefore, the slave control unit can grasp that the first communication method is used before the suppression of the generation of noise from the noise generating source N1 such that the operations of the motors 215, 312 are permitted, etc. is completed so that the present processing is an appropriate example of the program update.

After that, the main body control unit 23 transmits a rewriting command of the slave device firmware PF3 of the flash memory 310 to the slave control unit 33 (Step S12). The slave control unit 33 that received the rewriting command executes the program update by using the slave device update program P3 stored in the RAM 303 (Step S13). By the flash memory rewriting processing, the slave device firmware PF3 of the flash memory 310 is rewritten. When the flash memory rewriting processing is completed, the slave control unit 33 notifies the completion of processing to the main body control unit 23 (Step S14).

After that, the main control program 23 executes the program update by using the main body device update program P2 stored in the RAM 203 (Step S15). By the flash memory rewriting processing, the main body device firmware PF2 of the flash memory 210 is rewritten. When the main body device update program P2 is included in the update program P1, the processing of Step S15 may be omitted. When the flash memory rewriting processing is completed, the main body control unit 23 notifies the completion of processing to the external device H1 (Step S16).

After the transmission of the slave device update program P3, the main body control unit 23 that performs the processing of the aforementioned Steps S12 and S15 executes the program update to the slave control unit 33 by using the slave device update program P3, and after that, it executes the program update for own device by using the main body device update program P2. The main body device firmware PF2 that realizes the function of the main control unit is rewritten at end so that the present processing is an appropriate example of the program update.

Even when the flash memory rewriting processing was completed, the firmware PF2, PF3 after rewriting has not been executed. Therefore, the slave control unit 33 performs a restart processing to execute the slave device firmware PF3 after processing Step S13 and rewriting (Step S17). The slave device update program P3 stored in the RAM 303 is deleted or volatilized by the restart. When the restart processing is performed, a sleep signal to the motor driver 311 from the motor control unit 304 is not outputted so that the motor 312 becomes operable. Therefore, the suppression of the generation of noise from the noise generating source N1 of the slave device 3 is terminated in accordance with the restart of the slave control unit 33 so that the present processing is an appropriate example of the program update.

Further, the main body control unit 23 performs a restart processing that executes the main body device firmware PF2 after processing Step S15 and rewriting (Step S18). The update program P1 stored in the RAM 203 is deleted or volatilized by the restart. When the restart processing is performed, a sleep signal to the motor driver 214 from the motor control unit 207 is not outputted, and a sleep signal to the head driver 212 from the head control unit 206 is not outputted so that the motor 215 and the head 213 become operable. Therefore, the suppression of the generation of noise from the noise generating source N1 of the main body device 2 is terminated in accordance with the restart of the main body control unit 23 so that the present processing is an appropriate example of the program update.

As described above, when the update program P1 was acquired, by suppressing the generation of noise from the noise generating source N1, the slave device update program P3 can be transferred to the slave device 3 from the main body device 2 in the second communication method (second communication speed V2) which is faster than the first communication method (first communication speed V1) that is performed between the main body device 2 and the slave device 3 before the generation of noise from the noise generating source N1 is suppressed. Therefore, the time of the slave device update program transmission processing which occupies most of the processing from the update program acquisition to the program update is shortened. Accordingly, the present technology makes possible to shorten the update processing time of the program such as the firmware PF3 for the slave control unit 33.

Modified Example

Various modified examples are considered in the present invention.

For example, the slave device, which is applicable to the recording device, may be a double-sided printing unit, etc. other than the paper feeding device or the finisher. The parallel type processor that applies the recording device may be a manufacturing device of a color filter such as a liquid crystal display, etc., a manufacturing device of an electrode such as an organic EL display, etc., a biochip manufacturing device, etc.

The combination of the main body device and the slave device includes a combination of a projector and a document camera, a combination of a charging dock and an electric vehicle, etc. As the noise generating source of the projector, it may consider a lamp, a fan for heat dissipation, etc. As the noise generating source of the electric vehicle, it may consider a motor, lamp, etc.

Further, it is not limited to the first and second communication speeds as described above so that it may be sufficient if it is an appropriate communication speed in response to the noise generating source.

Further, the aforementioned processing may be arbitrarily changeable such that the order may be changed, etc. For example, the restart processing of the main body control unit which is the main control unit is preferably processed after the restart processing of the slave control unit, but it may be processed before the restart processing of the slave control unit, or the restart processing of the slave control unit may be processed simultaneously. Further, the rewriting of the main body device firmware is preferably processed after the rewriting of the slave device firmware, but it may be processed before the rewriting of the slave device firmware or the rewriting of the slave device firmware may be processed simultaneously.

Figure 6:
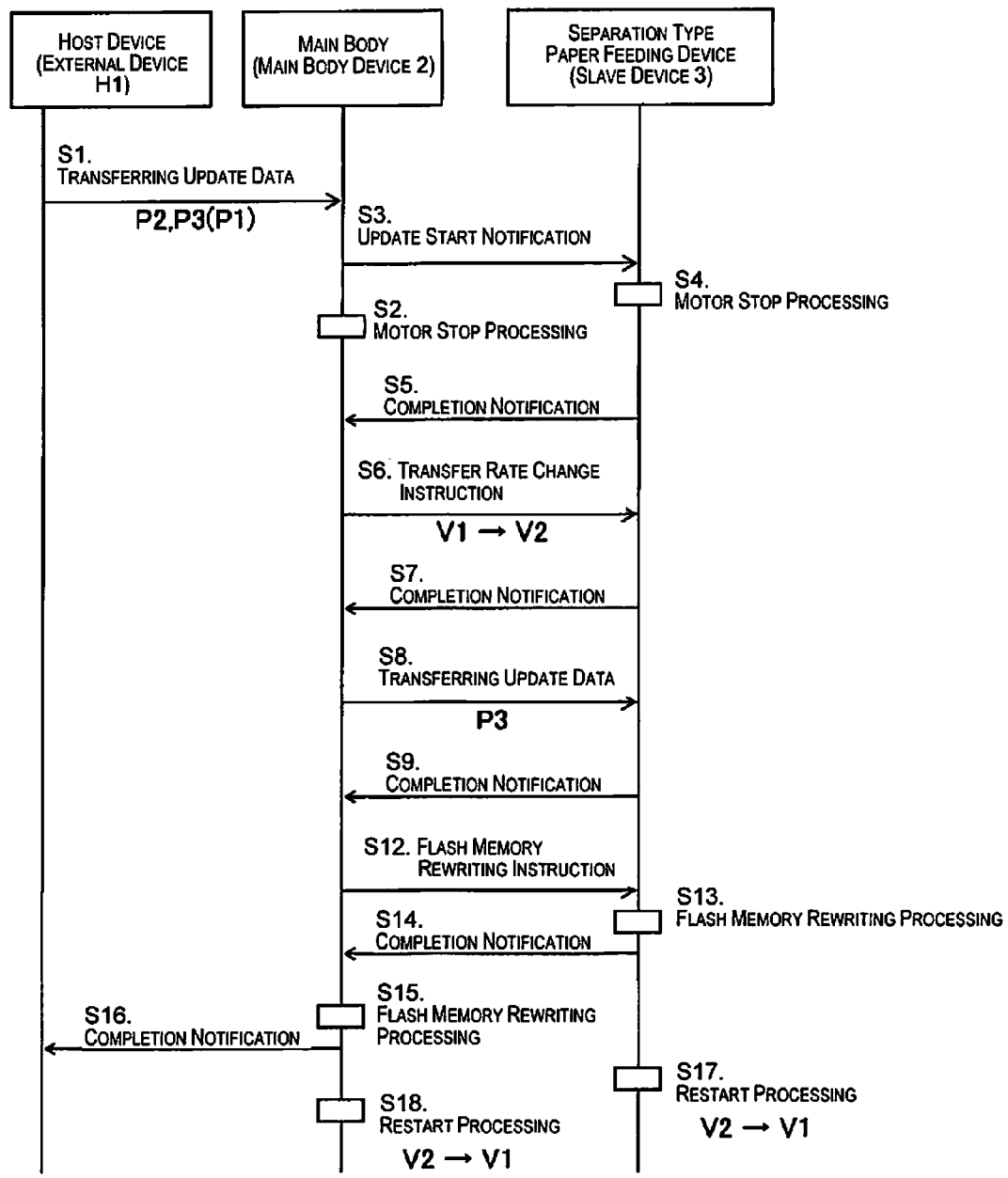
FIG. 6 is a sequence diagram showing a modified example of an operation of the system SY1.

FIG. 6 shows a modified example of the operation of the recording system SY1. In this example, when it compares with the processing shown in FIG. 5, Steps S3 and S4 are processed before Step S2, and Steps S10 and S11 are removed.

When the main body device 2 acquires the update program P1 and stores it in the RAM 203 (Step S1), first, the main body control unit 23 notifies the firmware update start to the slave control unit 33 (Step S3). The slave control unit 33 received the update start notification retains the motor 312 in a stop state (Step S4). The main body control unit 23 that transmitted the update start notification maintains the motor 215 in the stop state (Step S2). Therefore, the generation of noise from the noise generating source N1 can be suppressed before the slave device update program P3 is transferred.

Further, the main body control unit 23 that received the reception completion notification of the slave device update program P3 (Step S9) rewrites the slave device firmware PF3 to the slave control unit 33 (Steps S12 to S14), and after that, rewrites the main body device firmware PF2 (Steps S15), and notifies the completion of processing to the external device H1 (Step S16). At this point, it is set to use the second communication method (second communication speed V2) for the communication between the main body device 2 and the slave device 3.

After the flash memory rewriting processing of Step S13, the slave control unit 33 performs a restart processing (Step S17). When the restart processing is performed, the communication with the main body device 2 in the slave device 3 is set to the first communication method (first communication speed V1). Further, after the flash memory rewriting processing of Step S15, the main body control unit 23 performs the restart processing (Step S18). When the restart processing is performed, the communication with the slave device 3 in the main body device 2 is set in the first communication method (first communication speed V1). Therefore, even when Steps S10 and S11 shown in FIG. 5 are not processed, the communication method between the main body device 2 and the slave device 3 is automatically switched from the second communication method (second communication speed V2) to the first communication method (first communication speed V1).

Further, it is not limited to the aforementioned descriptions such that where the noise generating source is located, and how many the noise generating source is provided. The noise generating source may be existed in a device which is not the main body device or the slave device that performs an update, and it can be applied in a case that at least one noise generating source is existed in any of three or more than three devices. It is also sufficient that the noise generating source may not be existed in any of the plurality of devices.

For example, when the second slave device 4 is provided in the parallel type processor 1, the data communication between the main body device 2 and the second slave device 4 in the processing of FIGS. 5 and 6 is performed in the same manner as the data communication between the main body device 2 and the first slave device 3, and the second slave control unit 43 may perform the same processing as the first slave control unit 33.

Figure 7:
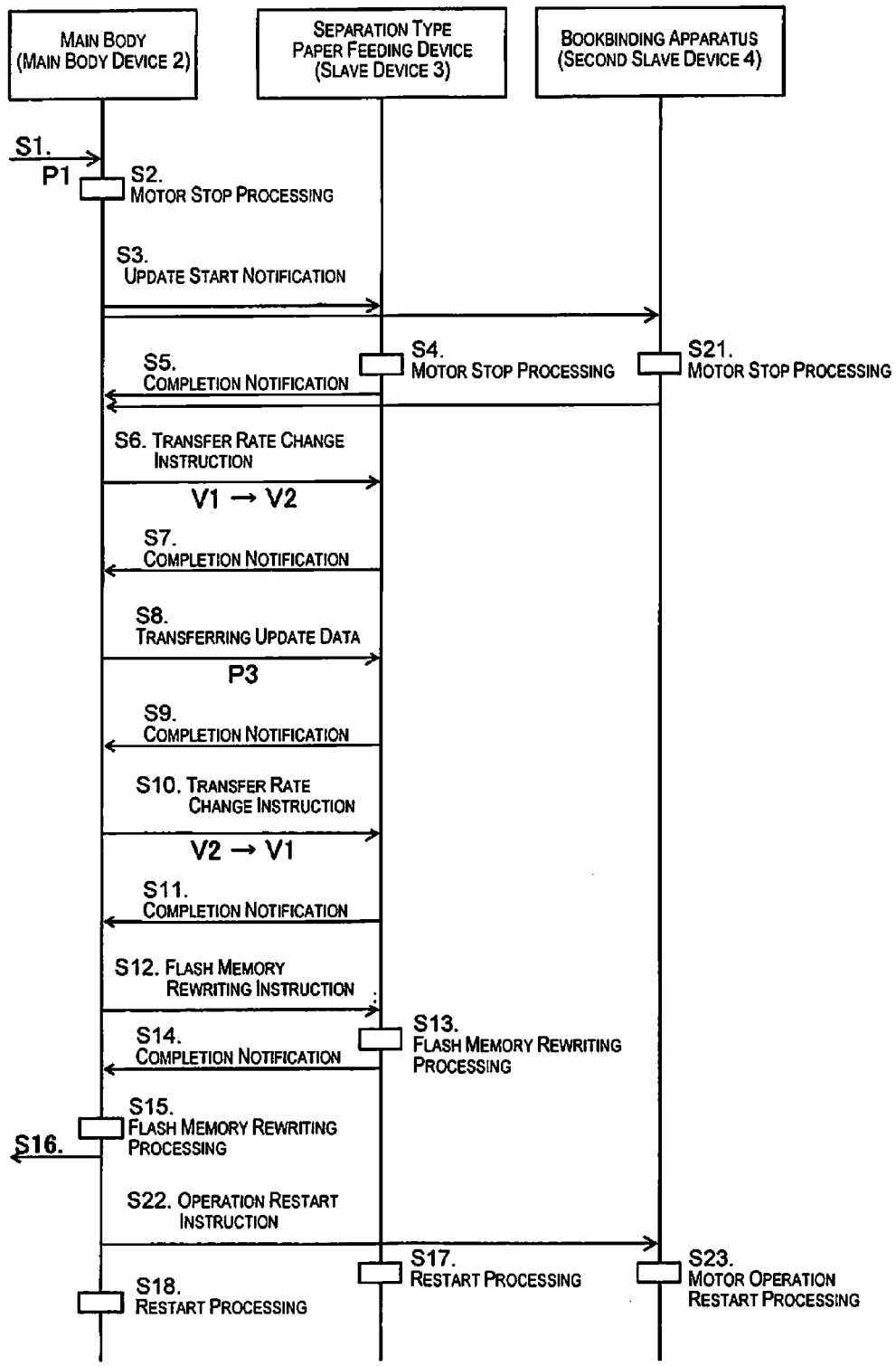
FIG. 7 is a sequence diagram showing a modified example of an operation of the system SY1.

FIG. 7 exemplifies an operation of the system SY1 having a printer main body (main body device 2), a paper feeding device (slave device 3), and a bookbinding apparatus (second slave device 4). The update program P1 includes the main body device update program P2 and the slave device update program P3, but it does not include the second slave device update program for the second slave control unit 43. When the second slave device 4 has a motor, etc., even though the second slave device 4 and the first slave device 3 are not directly connected, the noise, which is come from the motor, etc. of the second slave device 4, is sometimes entered to the communication between the main body device 2 and the slave device 3 through the main body device 2. In this case, the processing shown in FIG. 7 becomes effective.

When the main body device 2 acquires the update program P1 and stores it in the RAM 203 (Step S1), the main body control unit 23 maintains the motor 215 in a stop state (Step S2). Next, the main body control unit 23 notifies the firmware update start to the slave control unit 33 and the second slave control unit 43 in the first communication method (first communication speed V1)(Step S3). The slave control unit 33 that received the update start notification maintains the motor 312 in a stop state (Step S4), and notifies the completion of processing to the main body control unit 23 (Step S5). The second slave control unit 43 that received the update start notification maintains the motor of the second slave device 4 in a stop state (Step S21), and notifies the completion of processing to the main body control unit 23 (Step S5).

After that, the main body control unit 23 notifies to the slave control unit 33 that the transfer rate is changed from V1 to V2 (Step S6). The update program is not transferred to the second slave control unit 43 so that it does not notify that the transfer rate is changed, but it may be notified. When the main body control unit 23 receives the notification of the completion of processing (Step S7), the slave device update program P3 is transmitted to the slave control unit 33 in the second communication method (second communication speed V2) (Step S8). The program update by using the update programs P2, P3 is executed by performing the processing of Steps S9 to S15, and the completion of processing is notified to the external device H1 (Step S16), and the main body control unit 23 notifies an operation restart instruction of the motor of the second slave device 4 to the second slave control unit 43 (Step S22). The second slave control unit 43 that received the operation restart instruction performs a motor operation restart processing that permits an operation of the motor of the second slave device 4 by stopping the output of the sleep signal to the motor driver 311 (Step S23). After the flash memory rewriting processing of Step S13, the slave control unit 33 performs a restart processing (Step S17). Further, after the flash memory rewriting processing of Step S15, the main body control unit 23 performs a restart processing (Step S18).

When the main body control unit 23 transmits the slave device update program P3 to the slave control unit 33 of the first slave device 3, by suppressing the generation of noise from the noise generating source provided in the second slave device 4, which is different from the main body device 2 and the first slave device, the slave device update program P3 can be transmitted in the second communication method which is high-speed. Accordingly, the present processing is an appropriate example of the program update when the second slave device is included in the parallel type processor. When the firmware of the bookbinding apparatus is rewritten, the positions of the bookbinding apparatus and the paper feeding device are switched, and the bookbinding apparatus may be performed as the processing of the first slave device and the paper feeding device may be performed as the processing of the second slave device. Alternatively, both the notification and the data transfer may be performed in the same step from the main body control unit 23 to the first slave device and the second slave device.

Conclusion

As described above, according to the present invention, in the various aspects, the technologies, etc. that the update processing time of the program for the slave control unit, which controls the slave device, is shortened can be provided. Even though the technologies, etc. which are configured by the components applied to the independent claims and do not have the components applied to the dependent claims, the fundamental effects can be obtained.

Further, it is possible to provide the configuration in which the respective components disclosed in the aforementioned embodiments and modified examples may be replaced or the combination may be changed mutually, the configuration in which the respective components disclosed in the public known technologies and the aforementioned embodiments and modified examples may be replaced or the combination may be changed mutually, etc. The present invention also includes these configurations, etc.

The entire disclosure of Japanese Patent Application No. 2013-157072, filed Jul. 29, 2013 is incorporated by reference herein.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A main body electric device configured to communicate with a slave electric device, the main body electric device comprising:
    an acquisition circuit configured to acquire an update program that includes at least a slave electric device update program for a slave control circuit that is configured to control the slave electric device, from an external device; and
    a main body control circuit configured to control the main body electric device;
    the main body control circuit being configured to suppress a generation of noise from a noise generating source that has a possibility to generate noise to a communication between the main body electric device and the slave electric device, and subsequently transmit the slave electric device update program to the slave control circuit in a second communication method that is faster than a first communication method,
    the first communication method being a communication method performed between the main body electric device and the slave electric device before the generation of noise is suppressed.

2. The main body electric device according to claim 1, wherein
    after transmitting to the slave control circuit the slave electric device update program included in the update program that includes a main body electric device update program for own device, the main body control circuit controls the slave control circuit to execute a program update by using the slave electric device update program and subsequently executes own program update by using the main body electric device update program.

3. The main body electric device according to claim 1, wherein
    after suppressing the generation of noise from the noise generating source, the main body control circuit notifies to the slave control circuit that the second communication method is used.

4. The main body electric device according to claim 1, wherein
    the noise generating source is provided in a second slave electric device that is configured to communicate with the main body electric device,
    the main body control circuit controls the second slave electric device to suppress the generation of noise from the noise generating source, and subsequently transmits the slave electric device update program to the slave control circuit of the slave electric device in the second communication method.

5. The main body electric device according to claim 1, wherein
    the noise generating source is provided in the main body electric device, and
    after transmitting to the slave control circuit the slave electric device update program included in the update program that includes the main body electric device update program for own device, the main body control circuit executes own program update by using the main body electric device update program and performs a restart, and
    in the noise generating source, suppression of the generation of noise is terminated in accordance with the restart of the main body control circuit.

6. The main body electric device according to claim 1, wherein
    the noise generating source is provided in the slave electric device,
    after transmitting the slave electric device update program to the slave control circuit, the main body control circuit controls the slave control circuit to execute the program update by using the slave electric device update program and restart the slave control circuit, and
    in the noise generating source, suppression of the generation of noise is terminated in accordance with the restart of the slave control circuit.

7. A slave electric device configured to communicate with a main body electric device that is configured to acquire an update program from an external device, the slave electric device comprising:
    a slave control circuit configured to control the slave electric device and execute a program update by using a slave electric device update program for own device;
    the slave control circuit suppressing a generation of noise from a noise generating source that has a possibility to generate noise to a communication between the main body electric device and the slave electric device, and subsequently receiving the slave electric device update program from the main body control circuit in a second communication method which is faster than a first communication method, and
    the first communication method being a communication method performed between the main body electric device and the slave electric device before the generation of noise is suppressed.

8. A program update method comprising:
    acquiring an update program, which includes at least a slave device update program for a slave control unit that is configured to control a slave device, in a main body device from an external device;
    suppressing a generation of noise from a noise generating source that has a possibility to generate noise to a communication between the main body device and the slave device in a case where the update program has been acquired; and
    transferring the slave device update program to the slave device from the main body device in a second communication method which is faster than a first communication method after the generation of noise from the noise generating source has been suppressed;
the first communication method being a communication method performed between the main body device and the slave device before the generation of noise is suppressed.

\* \* \* \* \*